US006197276B1

(12) United States Patent
Kolenda et al.

(10) Patent No.: US 6,197,276 B1
(45) Date of Patent: *Mar. 6, 2001

(54) HYDRATED ALUMINUM COMPOUNDS, THEIR PREPARATION AND USE THEREOF

(75) Inventors: Frédéric Kolenda, Lyons; Jean-Louis Guth, Mulhouse; Sabine Valange, Leignon Belgique; Zelimir Gabelica, Warenne-Oleye Belgique; Eric Benazzi, Chatou, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 43 days.

This patent is subject to a terminal disclaimer.

(21) Appl. No.: 09/249,077

(22) Filed: Feb. 12, 1999

Related U.S. Application Data
(60) Provisional application No. 60/074,687, filed on Feb. 13, 1998, and provisional application No. 60/082,279, filed on Apr. 20, 1998.

(51) Int. Cl.⁷ ........................................................ C01F 7/02

(52) U.S. Cl. .......................... 423/600; 423/625; 423/628; 423/630

(58) Field of Search ..................................... 423/626, 628, 423/630, 631, 625, 600, 702, 713

(56) References Cited

U.S. PATENT DOCUMENTS

| 4,579,729 | 4/1986 | Schoenthal et al. |
| 6,027,706 | * 2/2000 | Pinnavaia et al. ................... 423/630 |

FOREIGN PATENT DOCUMENTS

| 0 670 286 | 9/1995 | (EP) . |
| 670286 | * 9/1995 | (EP) . |
| 96 39357 | 12/1996 | (WO) . |

OTHER PUBLICATIONS

A. Stein et al. "Aluminum–containing mesostructural materials." Journal Of Porous Materials vol. 3, 1996, pp. 83–92, No Month.

Qisheng Hou et al.:"Organization of organic molecules with inorganic molecular species into nanocomposite biphase arrays" Chemisty of Materials, vol. 6, No. 8, 1994, pp. 1176–1191, No Month.

Vaudry F et al: "Synthesis of pure alumina Mesoporous material" Chemistry of Materials, vol. 8, No. 7, Jul. 1996 pp. 1451–1464.

M. Yada et al.: "Synthesis and deorganization of an aluminum–based dodecyl sulfate mesophase with a hexagonal structure." Chemical Communications, 1996, pp. 769–770, No Month.

English Abstract of EP 0 670 286, Sep. 1995.

Stein, "Aluminum–containing Mesostructural Materials" J. Porous Materials, vol. 3, pp. 83–92, 1996.*

Hub, "Organization of Organic Molecules with Inorganic Molecular Species Into Nanocomposite Biphase Arrays" Chemistry of Matrials, 6(8), pp. 1176–91, 1994.*

* cited by examiner

Primary Examiner—Steven Bos
(74) Attorney, Agent, or Firm—Millen, White, Zelano & Branigan, P.C.

(57) ABSTRACT

Hydrated aluminium compounds of the present invention are represented by the general formula nS, mM, $Al_2O_3$, $xH_2O$ where S is a surfactant or a group of surfactants, n is the number of moles of S, M is an alkaline cation, preferably selected from the group formed by $Na^+$, $K^+$, $NH_4^+$, m is the number of moles of M and x is the number of moles of water. The hydrated compounds are obtained from inorganic aluminium sources which are in the form of cation-monomers and/or cation-oligomers. The surfactants are anionic and/or non-ionic surfactants. When the group of surfactants comprises at least one anionic surfactant, at least one cationic surfactant can optionally be added.

15 Claims, 5 Drawing Sheets

HYDRATED ALUMINUM COMPOUNDS, THEIR PREPARATION AND USE THEREOF

CROSS REFERENCE TO PROVISIONAL APPLICATIONS

This application is a regular application claiming priority under 35 U.S.C. 19(e) of Provisional Applications 60/074, 687 filed Feb. 13, 1998 and 60/082,279 filed Apr. 20, 1998.

The invention concerns hydrated aluminium compounds, their preparation and the uses thereof.

During the course of research into aluminas with controlled porosity with a pore diameter of about 0.6 to 20 nm. we became interested in alumina precursors obtained from at least one inorganic aluminium source and at least one surfactant in an essentially aqueous medium at a controlled pH.

International patent WO 96/39357 describes a route using non-ionic surfactants such as polyethylene oxides and neutral precursors of inorganic oxides as sources of the reactants. That synthesis is carried out in an organic solvent. Porous inorganic oxides are prepared by this route from non-ionic surfactants.

Research carried out on the controlled hydrolysis of Al(OR')$_3$ type organic alumina precursors, where R' is a linear or branched alkyl group containing 1 to 5 carbon atoms, has distinguished the case where the template is a quaternary ammonium type, and the medium is a mixed water-alcohol, and the case where the template is a surfactant or an amphiphilic molecule, where the reaction is carried out in an organic solvent. Vaudry and Davis in Chem. Mater., 1996, p 1451 use fatty acid type surfactants. S. Bagshaw, T. J. Pinnavaia describe the production of lamellar phases in "Mesoporous alumina molecular sieves", Angew. Chem. Intl. Ed. Engl. 1996, 35; 10, pages 1102–1105.

We have synthesised hydrated aluminium compounds from reactants in which the starting aluminium is in the $Al^{3+}$ and/or in the $Al_{13}$ form.

Hydrated aluminium compounds of the present invention are represented by the general formula (nS, mM, $Al_2O_3$, $xH_2O$) where S is a surfactant or a group of surfactants, n is the number of moles of S, M is an alkaline cation, m is the number of moles of M and x is the number of moles of water.

In the present description, S represents a surfactant or possibly a group of surfactants; S never represents sulphur in the present case.

Hydrated aluminium compounds of the present invention are represented by the general formula (nS, mM, $Al_2O_3$, $xH_2O$) where the number of moles n of surfactants S is about 0.1 to 2.2. the number of moles m of alkaline cation M is about 0.001 to 0.6, and the number of moles x of water is about 0.5 to 8.

When the starting aluminium is of type $Al^{3+}$, the coefficients n, m and x in formula (nS, mM, $Al_2O_3$, $xH_2O$) are such that n is about 0.1 to 1.8, m is about 0.001 to 0.6 and x is about 0.5 to 8.

When the starting aluminium is of type $Al_{13}$, the coefficients n, m and x in formula (nS, mM, $Al_2O_3$, $xH_2O$) are such that n is about 0.1 to 2.2, m is about 0.001 to 0.6 and x is about 0.5 to 6.

In the present description, the abbreviation "nm" will be used to represent a nanometer, i.e., $10^{-9}$ meters.

These hydrated aluminium compounds can be used as precursors for aluminas with controlled porosity where the pore diameter is about 0.6 nm to 20 nm, preferably about 0.6 to 15 nm, more preferably about 0.6 to 10 nm. These aluminas obtained from these precursors can be used, for example, to obtain adsorbents and catalyst supports.

The preparation of oxides with controlled porosity is based on the fact that organic molecules classified as surfactants can combine together, in particular when subjected to the conditions used to synthesise controlled porosity oxides. They form micelles which have electrical charges on their surface and a geometry which varies depending on the conditions in the synthesis medium. Such micelles can then build around them polymeric species of mineral oxides such as silica, alumina or other metals such as titanium, and thus generate a solid framework with a controlled porosity.

The invention concerns hydrated aluminium compounds with general formula (nS, mM, $Al_2O_3$, $xH_2O$) where the portion comprising the water and the surfactants represents about 40% to 80% by weight of the compound. The X ray diffraction diagram of the hydrated compounds of the present invention is characterized by a peak which corresponds to an interplanar distance "d" of about 1 to 15 nanometers.

The compounds of the invention are synthesised from inorganic aluminium sources which are in the form of cation-monomers and/or cation-oligomers, a cation-monomer being, for example, the ion $[Al(H_2O)_6]^{3+}$ where the aluminium is in the form $Al^{3+}$, and a cation-oligomer being, foor example, an ion $[Al_{13}O_4(OH)_{24}(H_2O)_{12}]^{7+}$ with a Keggin type structure, in which the aluminium is in the form $Al_{13}$. The $Al_{13}$ aluminium form, also known as the Keggin ion, has a cluster structure in which octahedral sites are associated with tetrahedral sites, the tetrahedral sites representing about 1% to 20% of the sites, usually about 6% to 10% of the sites.

The hydrated aluminium compounds of the present invention exhibit octahedral sites associated with tetrahedral sites in which the percentage of tetrahedral sites represents about 0 to 20% of the total number of sites.

In the formula (nS, mM, $Al_2O_3$, $xH_2O$), M is an alkaline cation, preferably selected from the group formed by $Na^+$, $K^+$, $NH_4^+$; S is a group comprising at least one surfactant, these surfactants being anionic and/or non-ionic surfactants. When the group of surfactants comprises at least one anionic surfactant, at least one cationic surfactant can optionally be added such that the total charge on the ensemble of the surfactants remains negative.

The anionic surfactants are generally selected from the group formed by alkyl carboxylates, alkyl sulphates, alkyl sulphonates and alkylphenyl sulphonates.

The non-ionic surfactants are generally selected from the group formed by alkylpolyethylene oxides, alkylphenylpolyethylene oxides, alkylphosphine oxides and alkylamine oxides.

The cationic surfzactants are generally selected from the group formed by alkylammonium salts, alkylphosphonium salts, and alkylsulphonium salts.

The scope of the invention also encompasses the use of surfactants in which a plurality of functions co-exist, either amphoteric surfactants in which anionic and cationic functions co-exist, or surfactants in which anionic and non-ionic functions co-exist such as C-betaine, N-betaine, an alkylpolyoxyethylene sulphate or an alkylpolyoxyethylene sulphonate.

The advantages of the compounds of the invention are as follows: they are synthesised in a less contaminating, less expensive medium where the major solvent, and the only solvent, is water, using inorganic aluminium sources which are less expensive and easy to use.

Synthesis of the compounds of the invention is carried out using at least one inorganic aluminium source using a base, in the presence of at least one surfactant. The inorganic aluminium sources are cation-monomers and/or cation-oligomers. Synthesis is carried out in an essentially aqueous medium with a pH which is about 4.5 to 10.5.

The compounds of the invention are generally synthesised as follows: at least one inorganic aluminium source in the form of cation-monomers and/or cation-oligomers is reacted with at least one surfactant. The inorganic aluminium source is introduced into the mixture in the cationic form $I^+$, the surfactants are anionic $S^-$ and/or non-ionic S. If the solution contains at least anionic surfactants $S^-$, cationic surfactants $S^+$ can optionally be added, the quantity of added cationic surfactants being such that the total charge of the ensemble of surfactants is negative, the charge of the inorganic surface remaining positive, following a type $S^-I^+$ mechanism. However, depending on the pH of the solution particularly when the pH is over 9, the negative charges on the surfaces of the alumina species $I^-$ can become the majority, and these micelles can then produce $S^-M^+I^-$ type interactions where $M^+$ is the compensating cation of the surfactant.

Without wishing to be bound to any particular theory, it can be considered that the surfactants control polycondensation of the compounds of the invention by multiple interactions such as covalent S-I interactions, ionic "hydrogen bridge" $S^0$ $I^0$ type interactions, and $S^-I^{30}$ and $S^+I^-$ interactions between charged species. These interactions depend on the nature of the surfactants and the pH of the aqueous medium. The interactions are always of type $S^-I^+$ if anionic surfactants are used, and to these electrostatic interactions, S-I or $S^0I^0$ interactions can be added if non-ionic surfactants are associated with the preceding micelles. It is also possible to control polycondensation by interactions which are solely of the $S^0I^0$ (or S-I) type using non-ionic surfactants. When cationic surfactants $S^+$ are added, $S^+I^-$ type interactions are also present.

The compounds of the invention are synthesised in aqueous media where the pH encourages formation on the surface of the inorganic material of positive charges which are in the majority over the negative charges, these positively charged surfaces preferably being obtained in the presence of globally negative micelles, the sum of the interactions between the charged species $S^-I^+$ usually being higher than the sum of the interactions between charged species $S^+I^-$. The pH of the reaction medium is generally 4.5 to 10.5, preferably 5 to 10.

Synthesis of the compounds of the invention in the presence of a base, from at least one inorganic aluminium source—in the form of cation-monomers and/or cation-oligomers—and at least one surfactant, can also be carried out in the presence of one or more organic compounds. More particularly, when a micellar surfactant is used, these organic compounds modify the characteristics of the micelles, in their shape and dimensions. They are essentially non polar or slightly polar molecules where insertion into the hydrophobic portion of the micelles or into the region separating the hydrophilic portion from the hydrophobic portion of the micelles modifies their diameter and their radius of curvature. The organic compounds can also modify the solubility of the micelles in water. In all cases the solvent medium remains mainly aqueous, the quantity of organic compounds being about 0.001% to 20% by weight with respect to the total solvent mass.

The compounds of the invention are synthesised as follows: an aqueous solution A is prepared which contains an inorganic aluminium source and a solution B is prepared which contains at least one anionic surfactant and/or at least one non-ionic surfactant. When the solution contains at least one anionic surfactant, at least one cationic surfactant can optionally be added.

Depending on the species present, the pH of solution A can be very acidic, while solution B contains a base which is added in a quantity such that the final mixture has a pH of about 4.5 to 10.5, preferably about 5 to 10. Solution B also optionally contains an additive to modify the characteristics of the micelles (shape, dimensions). Solution B is poured all at once into solution A with vigorous stirring. The precipitate resulting from this mixing is stirred for a period of about 6 to 48 hours, preferably about 10 to 30 hours. During this period, the reaction medium is kept under the conditions in which the mixing was carried out. The temperature is about 15° C. to 90° C., preferably about 15° C. to 30° C.

The scope of the invention also encompasses synthesising the compounds by adding a separately prepared basic solution in the form of a solution C and adding to solution A all at once with vigorous stirring at the same time as solution B-solution B thus does not contain a base-or after addition of this solution B. This variation in the synthesis of the compounds of the invention may be of use when it is not possible to completely dissolve the surfactant or surfactants in solution B in the presence of a base. Other variations of the present invention are used to increase the solubility of the surfactant or surfactants, these variations consisting of heating solution B to a temperature of about 30° C. to 90° C. or partially replacing the water contained in solution B by at least one organic compound which is miscible with water and in which the surfactant or surfactants is/are more soluble.

After reaction, the precipitate is isolated by a suitable filtering or centrifuging means, the precipitate is then washed with water and air dried at a temperature of about 40° C. to 110° C. to a constant weight of precipitate. The drying period is generally about 2 hours to 30 hours, preferably about 10 hours to 20 hours. At the end of these treatments, a precursor for the controlled porosity alumina is obtained.

More particularly, solutions A containing aluminium in the form of cation-monomers such as $[Al(H_2O)_6]^{3+}$ are prepared by dissolving aluminium salts of strong acids (chlorides, nitrates, sulphates, perchlorates), the pH generally being about 1 to 3. Solutions A containing aluminium in the form of cation-oligomers such as $[Al_{13}O_4(OH)_{24}(H_2O)_{12}]^{7+}$ with a Keggin type structure are prepared using the following methods described in the literature: J. W. Akitt et al., J. Chem. Soc. Dalton Trans., 1988, p. 1347; J. W. Akitt et al., J. Chem. Soc. Dalton Trans 1981, p. 1617; J. W. Akitt et al., J. Chem. Soc. Dalton Trans., 1981, p. 1624; A. Schutz et al., Clays and Clay Minerals. 1987, 35 (4), 251. The concentration of aluminium in solution A is generally between 0.05 mol/l and 5 mol/l. preferably between 0.1 mol/l and 1 mol/l. The pH of these solutions is generally about 3 to 5 and the species are characterized by a degree of hydrolysis defined by the $OH^-/Al$ molar ratio which is about 1.3 to 2.7. For the ion $[Al_{13}O_4(OH)_{24}(H_2O)_{12}]^{7+}$ with a Keggin structure type, the $OH^-/Al$ molar ratio is preferably about 2.3 to 2.7.

Solutions B contain anionic and/or non-ionic surfactants. When solution B contains at least one anionic surfactant, cationic surfactants can optionally be added.

Additives which can optionally be added to solution B are generally non polar or slightly polar molecules these additives being selected from: alkanes with a chain containing 5 to 12 carbon atoms per molecule, preferably alkanes selected from the group formed by nonane and decane, aromatic hydrocarbons substituted with one or more hydrocarbon groups, preferably mesitylene, aliphatic alcohols with a chain containing 5 to 12 carbon atoms per molecule, preferably n-octanol, or aliphatic amines with a chain containing 5 to 12 carbon atoms per molecule, preferably hexylamines.

The concentration of surfactant or surfactants in solution B depends on their nature, i.e., their solubility and critical micellar concentration. When solution B is an aqueous solution, the concentration of surfactants in solution B is generally about 0.1 to 0.5 mol/l. When solution B is a mixture of water and an organic compound, the concentration of surfactants in solution B is generally about 0.20 to 1.5 mol/l.

The ratio of the number of moles of surfactants to the number of moles of aluminium in the mixture A+B is normally about 0.05 to 1.5, preferably about 0.10 to 0.80.

The base added to solution B is selected from a group of bases such as caustic soda (NaOH), potash (KOH), ammonium hydroxide ($NH_4OH$), methylamine ($CH_3NH_2$) or an alkali metal aluminate, preferably sodium aluminate or potassium aluminate. The choice of this base depends on the nature of the aluminium source in solution A, i.e., the degree of hydrolysis of this aluminium source and the desired pH.

The hydrated aluminium compounds obtained are characterized by an X ray diffraction diagram, a $^{27}Al$ aluminium nuclear magnetic resonance (NMR) spectrum with magnetic angle spinning, and by chemical analysis: carbon content (C), nitrogen content (N), alkali metal content: mainly the sodium content (Na) and water content. NMR spectra were produced using an aqueous $Li(AlNO_3)_3$ solution as a reference.

The X ray diffractoumeter used was a Phillips PW 1130 and the nuclear magnetic spectrometer used was a Bruker DSX 400. The carbon and nitrogen contents were determined by infrared detection, the sodium content by thermal absorption and the water content by the "Karl-Fisher" method.

When the X ray diffraction diagram exhibits one peak-or more-which corresponds to an interplanar distance "d", it can be deduced that the structure is crystalline, while a structure which exhibits no peaks is indisputably amorphous.

The $^{27}Al$ aluminium nuclear magnetic resonance (NMR) spectrum with magnetic angle spinning can be used to determine the aluminium co-ordination number in the structure: a chemical displacement of 0 to 20 ppm indicates the existence of octahedral aluminium; a chemical displacement of 20 to 65 ppm indicates the existence of tetrahedral aluminium.

Chemical analyses allows the number of moles n of surfactants, the number of moles m of alkaline cation and the number of moles x of water to be determined. In the following examples, surfactants were used in the form of a single compound or a mixture of compounds, and the alkaline cation used here was sodium ($Na^+$).

The following examples illustrate the invention without limiting its scope.

In examples 1 to 3, the inorganic aluminium source used as a reactant was a type $Al^{3+}$ cation.

EXAMPLE 1

A solution A was produced by dissolving 7.5 g of $Al(NO_3)_3, 9H_2O$ in 190 ml of water.

A solution B was produced by dispersing 2.23 g of sodium palmitate ($C_{16}H_{31}O_2Na$) and 0.73 g of hexadecyl trimethylammonium bromide in 40 ml of water by heating to 40° C.

A solution C was obtained by dissolving 2.4 g of caustic soda (NaOH) in 20 ml of water.

Solution B was poured all at once into solution A with vigorous stirring then immediately afterwards, solution C was added. The pH stabilised at about 7.5. The mixture was stirred at ambient temperature for 14 hours. The product obtained was filtered, washed with water and dried for 14 hours at 60° C., in air at atmospheric pressure.

3.75 g of hydrated aluminium compound was obtained.

Figure 1A:
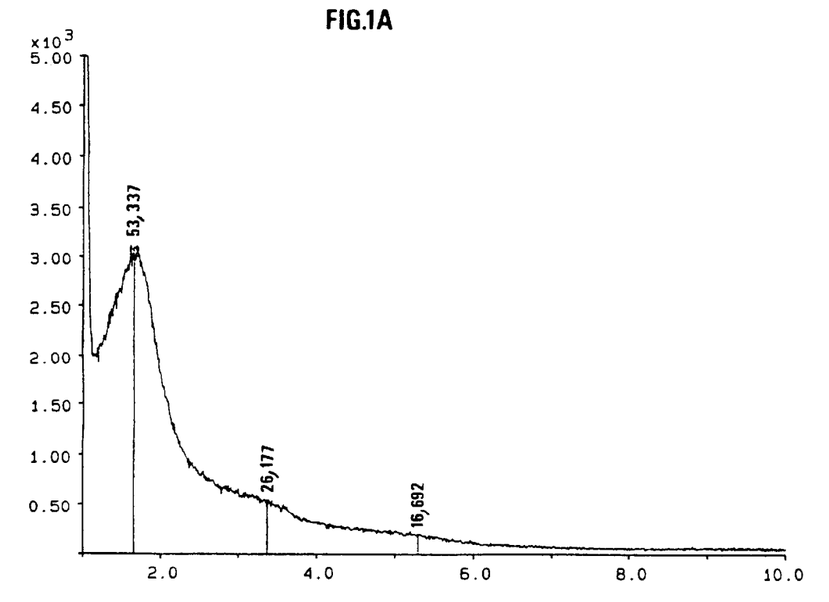
FIG. 1a depicts an X ray diffraction diagram of a hydrated aluminum compound as exemplified by Example 1.
Figure 1B:
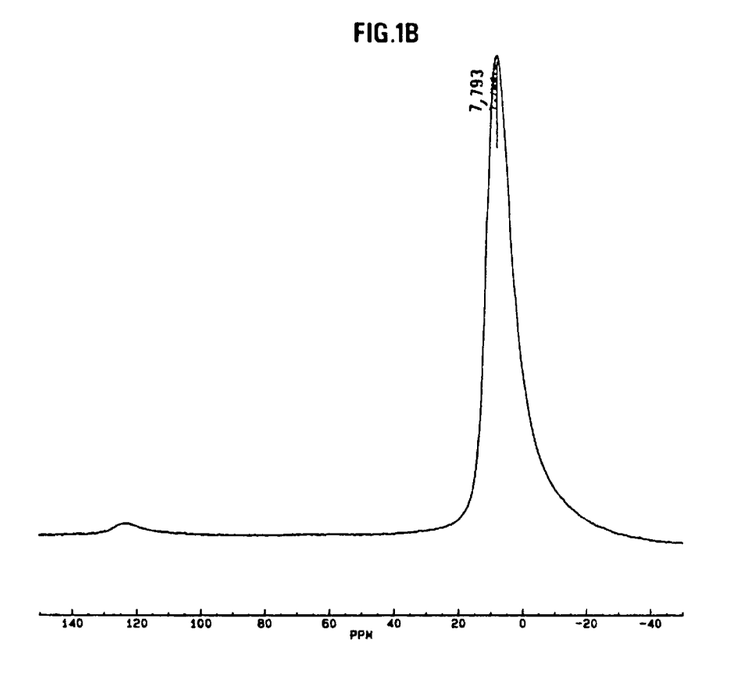
FIG. 1b depicts an NMR spectrum of a hydrated aluminum compound as exemplified by Example 1.

The X ray diffraction diagram of this compound (FIG. 1a) showed the presence of an intense peak which corresponded to an interplanar distance "d" of 5.3 nm. The $^{27}Al$ NMR spectrum (FIG. 1b) shows a peak with a chemical displacement of 7.8 ppm with respect to the reference, an aqueous $Li(AlNO_3)_3$ solution, this chemical displacement being characteristic of octahedral coordination.

Chemical analyses carried out on the hydrated compound showed that the number of moles of surfactants n was 0.8, the number of moles m of alkaline cation (sodium) was 0.16 and the number of moles x of water was 1.1.

EXAMPLE 2

A solution A was produced by dissolving 7.5 g of $Al(NO_3)_3, 9H_2O$ in 190 ml of water.

A solution B was produced by dispersing 7.64 g of an aqueous 30% by weight solution of N,N-dimethyldodecylamine-N-oxide and 2.4 g of caustic soda (NaOH) in 40 ml of water.

Solution B was poured all at once into solution A with vigorous stirring. The pH stabilised at about 7.5. The mixture was stirred at ambient temperature for 14 hours. The product obtained was filtered, washed with water and dried for 14 hours at 60° C., in air at atmospheric pressure.

1.9 g of hydrated aluminium compound was obtained.

Figure 2A:
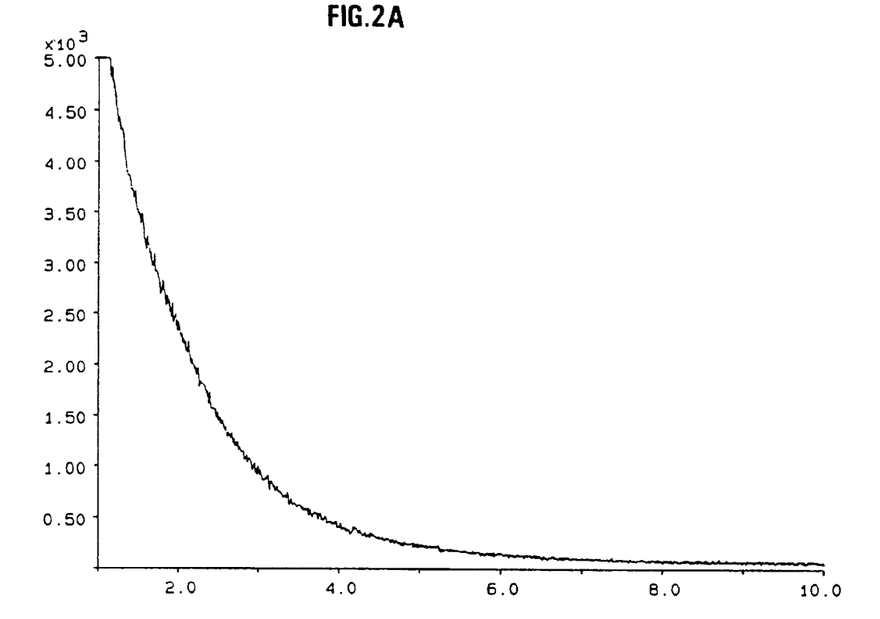
FIG. 2a depicts an X ray diffraction diagram of a hydrated aluminum compound as exemplified by Example 2.
Figure 2B:
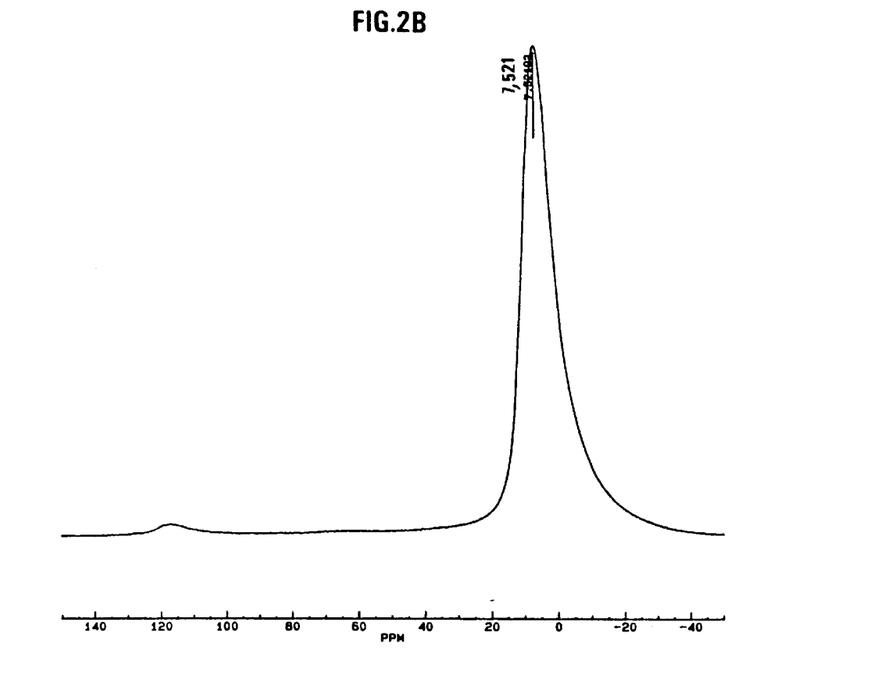
FIG. 2b depicts an NMR spectrum of a hydrated aluminum compound as exemplified by Example 2.

The X ray diffraction diagram of this compound (FIG. 2a) showed the presence of a diffuse central peak. The $^{27}Al$ NMR spectrum (FIG. 2b) showed a peak with a chemical displacement of 7.5 ppm, characteristic of octahedral coordination.

Chemical analyses carried out on the hydrated compound showed that the number of moles n of surfactants was 0.2, the number of moles m of alkaline cation (sodium) was 0.06 and the number of moles x of water was 2.

EXAMPLE 3

A solution A was produced by dissolving 7.5 g of $Al(NO_3)_3$, $9H_2O$ in 190 ml of water.

A solution B was produced by dissolving 2.0 g of lauric acid ($C_{12}H_{24}O_2$) and 2.56 g of NaOH in 40 ml of water by heating to 50° C.

Solution B was poured all at once into solution A with vigorous stirring. The pH stabilised at between 5.5 and 6. The mixture was stirred at ambient temperature for 14 hours. The product obtained was filtered, washed with water and dried for 14 hours at 60° C., in air at atmospheric pressure. 3.4 g of hydrated aluminium compound was obtained.

Figure 3A:
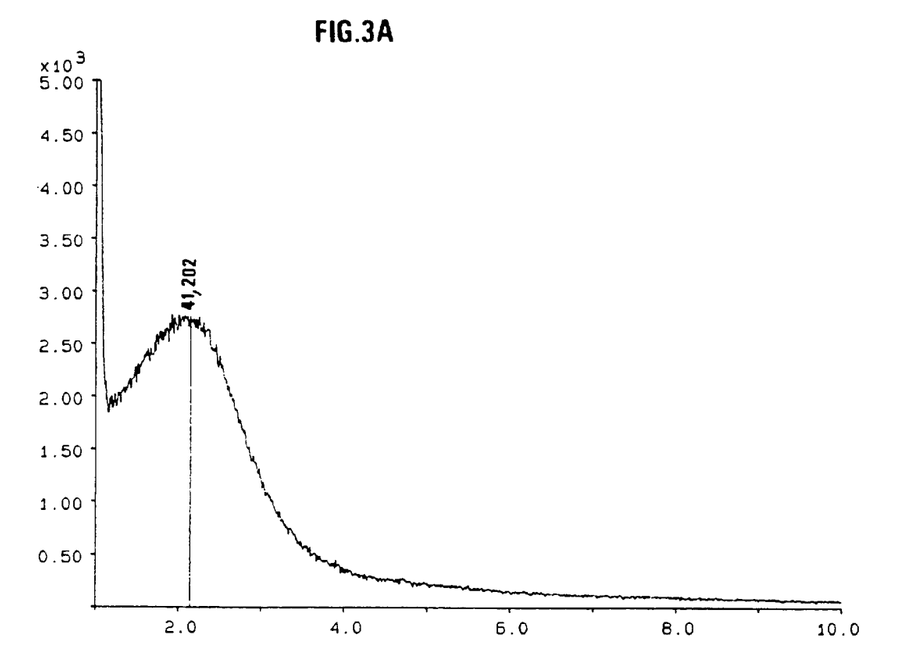
FIG. 3a depicts an X ray diffraction diagram of a hydrated aluminum compound as exemplified by Example 3.
Figure 3B:
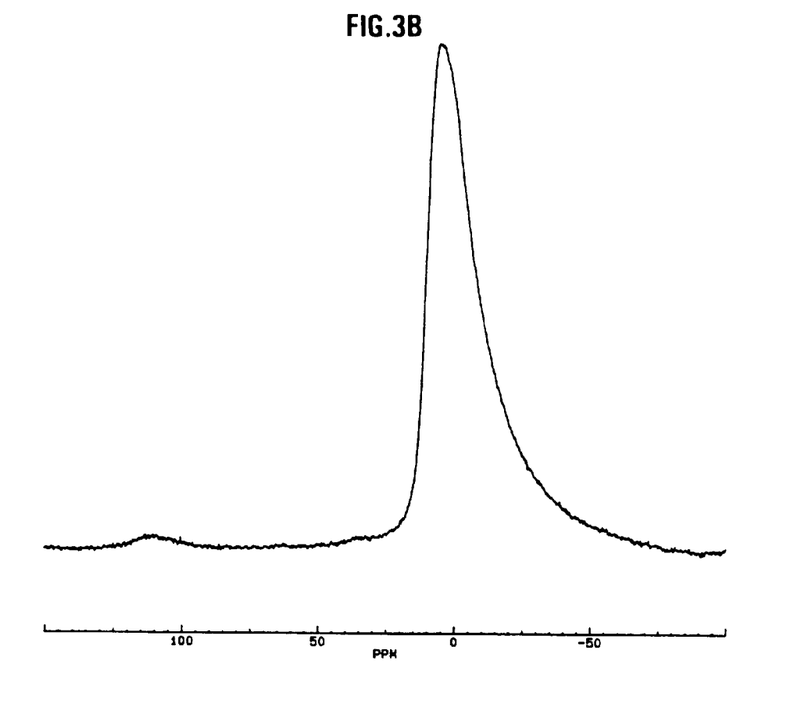
FIG. 3b depicts an NMR spectrum of a hydrated aluminum compound as exemplified by Example 3.

The X ray diffraction diagram of this compound (FIG. 3a) showed the presence of an intense peak which corresponded to an interplanar distance "d" of 4.1 nm. The $^{27}Al$ NMR spectrum (FIG. 3b) showed a peak which is characteristic of octahedral co-ordination.

Chemical analyses carried out on the hydrated compound showed that the number of moles n of surfactants was 1.2, the number of moles m of alkaline cation (sodium) was 0.04 and the number of moles x of water was 6.5.

In Examples 4 to 7, the inorganic aluminium source used as a reactant was a type $Al_{13}$ cation.

Solutions A used in the following examples were produced from a solution of Keggin polycations prepared as follows: a solution of Keggin alumina polycations $[Al_{13}O_4(OH)_{24}(H_2O)_{12}]^{7+}$ was prepared by dropwise addition using a dropping funnel of a solution containing 8 g of caustic soda (NaOH) in 360 ml of water to a very vigorously stirred solution containing 30 g of $Al(NO_3)_3$, $9H_2O$ in 400 ml of water. The final solution had a pH of close to 4.5 and was perfectly clear.

190 ml of the Keggin polycation solution was removed to produce the A solutions of the following examples.

EXAMPLE 4

A solution B was produced by dissolving 2.0 g of lauric acid and 0.4 g of NaOH in 40 ml of water by heating to 40° C.

Solution B was poured all at once into solution A with vigorous stirring. The pH stabilised at 5. The mixture was stirred at ambient temperature for 14 hours. The product obtained was filtered, washed with water and dried for 14 hours at 60° C., in air at atmospheric pressure. 2.5 g of hydrated aluminium compound was obtained.

Figure 4A:
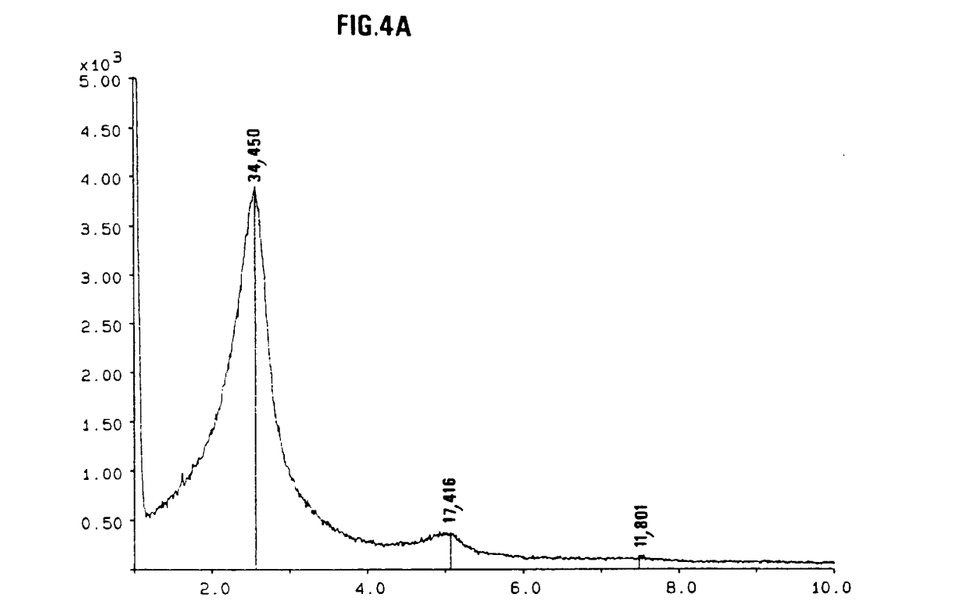
FIG. 4a depicts an X ray diffraction diagram of a hydrated aluminum compound as exemplified by Example 4.
Figure 4B:
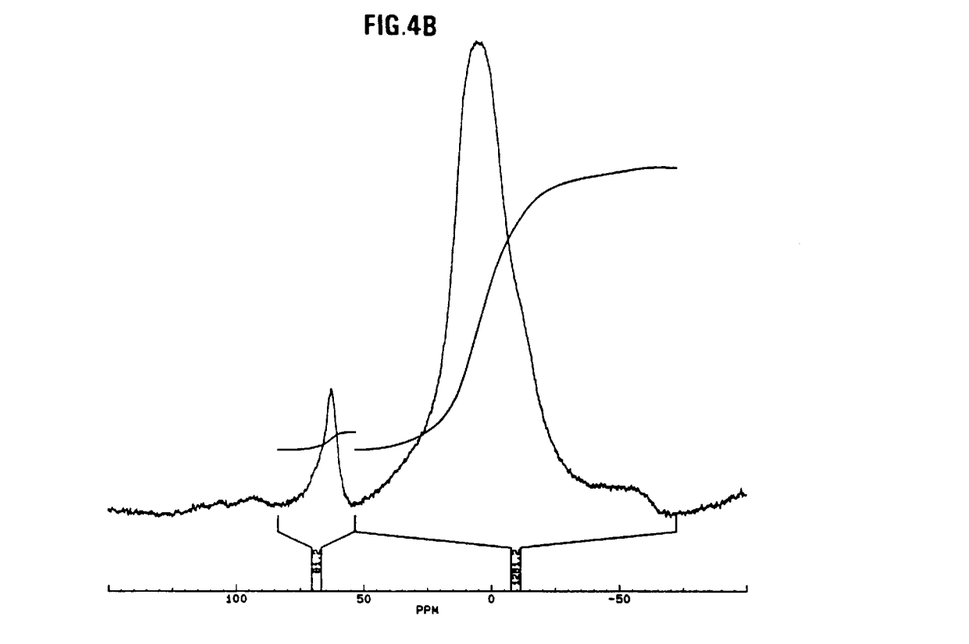
FIG. 4b depicts an NMR spectrum of a hydrated aluminum compound as exemplified by Example 4.

The X ray diffraction diagram of this compound (FIG. 4a) showed the presence of an intense peak which corresponded to an interplanar distance "d" of 3.6 nm and a peak which corresponded to an interplanar distance "d" of 1.8 nm (a harmonic of the intense peak). The $^{27}Al$ NMR spectrum (FIG. 4b) had two peaks, one being characteristic of octahedral co-ordination and the other being characteristic of tetrahedral co-ordination. The percentage of aluminium with a tetrahedral structure was 6% by weight with respect to the total aluminium.

Chemical analyses carried out on the hydrated compound showed that the number of moles n of surfactants was 1.4, the number of moles m of alkaline cation (sodium) was 0.02 and the number of moles x of water was 2.1.

EXAMPLE 5

A solution B was produced by dissolving 2.0 g of lauric acid ($C_{12}H_{24}O_2$) and 0.88 g of caustic soda (NaOH) in 40 ml of water by heating to 40° C.

Solution B was poured all at once into solution A with vigorous stirring. The pH stabilised at 9.5. The mixture was stirred at ambient temperature for 14 hours. The product obtained was filtered, washed with water and dried for 14 hours at 60° C., in air at atmospheric pressure. 3.3 g of hydrated aluminium compound was obtained.

Figure 5A:
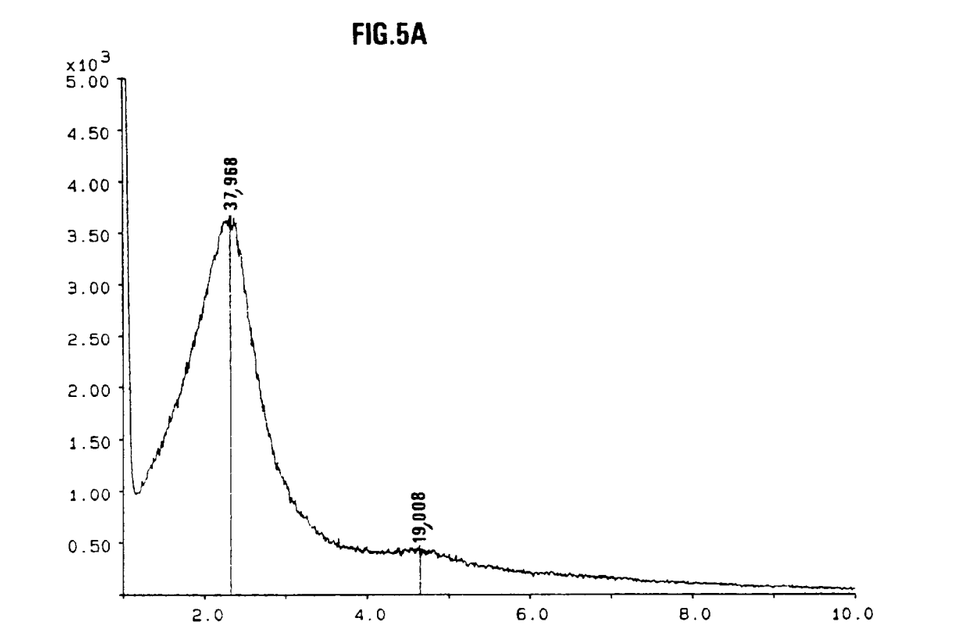
FIG. 5a depicts an X ray diffraction diagram of a hydrated aluminum compound as exemplified by Example 5.
Figure 5B:
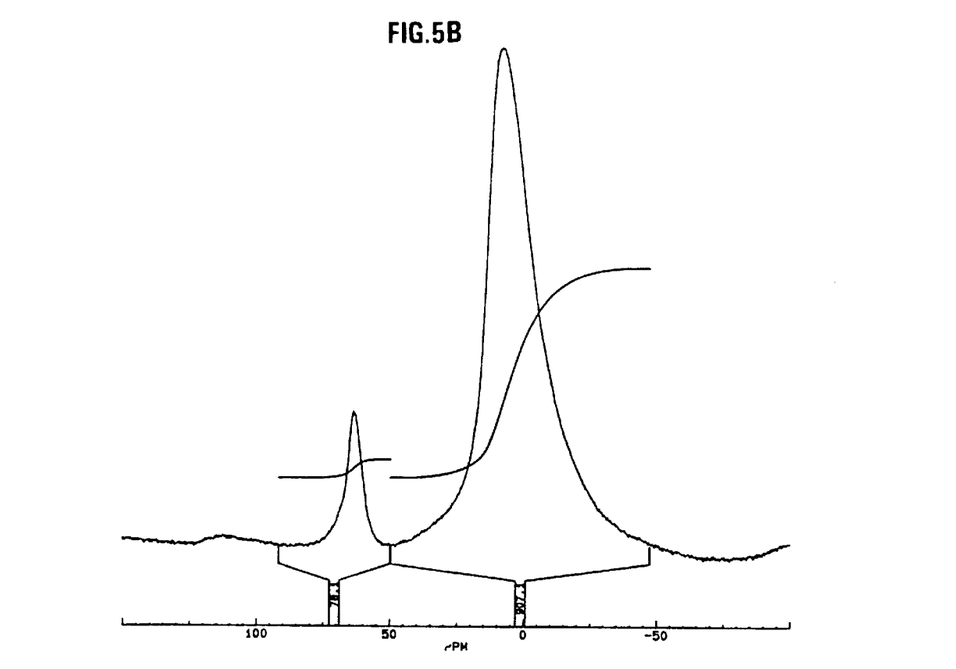
FIG. 5b depicts an NMR spectrum of a hydrated aluminum compound as exemplified by Example 5.

The X ray diffraction diagram of this compound (FIG. 5a) showed the presence of an intense peak which corresponded to an interplanar distance "d" of 3.8 nm and a peak which corresponded to an interplanar distance "d" of 1.9 nm (a harmonic of the intense peak). The $^{27}Al$ NNFR spectrum (FIG. 5b) had two peaks, characteristic of an association of octahedral co-ordination and tetrahedral co-ordination. The percentage of aluminium with a tetrahedral co-ordination was 8% by weight with respect to the total aluminium.

Chemical analyses carried out on the hydrated compound showed that the number of moles n of surfactants was 0.8, the number of moles m of alkaline cation (sodium) was 0.42 and the number of moles x of water was 3.7.

EXAMPLE 6

A solution B was produced by dissolving 2.23 g of sodium palmitate ($C_{16}H_{31}O_2Na$) with 0.73 g of hexadecyl trimethylammonium bromide and 2.4 g of 1,3,5-trimethylbenzene in 40 ml of water by heating to 60° C.

Solution B was poured all at once into solution A with vigorous stirring. The pH stabilised at 6.5. The mixture was stirred at ambient temperature for 14 hours. The product obtained was filtered, washed with water and dried for 14 hours at 60° C., in air at atmospheric pressure. 3.9 g of hydrated aluminium compound was obtained.

The X ray diffraction diagram showed a peak which corresponded to an interplanar distance "d" of 5.6 nm. The $^{27}Al$ NMR spectrum had two peaks which are characteristic of an association of octahedral co-ordination and tetrahedral coordination.

Chemical analyses carried out on the hydrated compound showed that the number of moles n of surfactants was 1, the number of moles m of alkaline cation (sodium) was 0.14 and the number of moles x of water was 4.

EXAMPLE 7

A solution B was produced by dissolving 7.65 g of an aqueous 30% by weight solution of N,N-dimethyldodecylamine-N-oxide, 2.4 g of 1,3,5-trimethylbenzene and 0.4 g of caustic soda (NaOH) in 40 ml of water at 35° C.

Solution B was poured all at once into solution A with vigorous stirring. The pH stabilised at about 7. The mixture was stirred at ambient temperature for 14 hours. After the 14 hours, the product obtained was filtered, washed with water and dried for 14 hours at 60° C. 2.5 g of hydrated aluminium compound was obtained.

The X ray diffraction diagram showed a peak which corresponded to an interplanar distance "d" of 7.3 nm. The $^{27}Al$ NMR spectrum had two peaks which are characteristic of an association of octahedral co-ordination and tetrahedral coordination.

Chemical analyses carried out on the hydrated compound showed that the number of moles n of surfactants was 0.3, the number of moles m of alkaline cation (sodium) was 0.008 and the number of moles x of water was 2.7.

The aluminium in the compounds obtained in Examples 1 to 3 preserved the octahedral co-ordination of the starting aluminium.

The aluminium in the compounds obtained in Examples 4 to 7 preserved the Keggin structure of the starting aluminium.

What is claimed is:

1. A hydrated aluminum compound comprising the general formula ($nS$, $mM$, $Al_2O_3$, $xH_2O$), where the number of moles n of surfactant(s) S is about 0.1 to 2.2, the number of moles m of alkaline cation M is about 0.001 to 0.6, and the number of moles x of water is about 0.5 to 8.

2. A hydrated aluminum compound according to claim 1, wherein an aluminum source of the alumina $Al_2O_3$ is of $Al^{3+}$, the coefficients n, m and x in the formula ($nS$, $mM$, $Al_2O_3$, $xH_2O$) being such that n is about 0.1 to 1.8, m is about 0.001 to 0.06 and x is about 0.5 to 8.

3. A hydrated aluminum compound according to claim 1, wherein an aluminum source of the alumina $Al_2O_3$ is of $Al_{13}$, the coefficients n, m and x in the formula ($nS$, $mM$, $Al_2O_3$, $xH_2O$) being such that n is about 0.1 to 2.2, m is about 0.001 to 0.06 and x is about 0.5 to 6.

4. A hydrated aluminum compound according to claim 1, wherein the alkaline cation M is selected from the sodium ion $Na^+$, the potassium ion $K^+$ or the ammonium ion $NH_4^+$.

5. A hydrated aluminum compound according to claim 1, wherein it exhibits octahedral sites associated with tetrahedral sites, in which the percentage of tetrahedral sites represents not more than about 20% of the total number of sites.

6. A hydrated aluminum compound according to claim 1, wherein the surfactant or surfactants comprise at least one anionic surfactant selected from alkyl carboxylates, alkyl sulphates, alkyl sulphonates, or alkylphenyl sulphonates.

7. A hydrated aluminum compound according to claim 6, wherein the surfactant or surfactants comprise at least one cationic surfactant selected from alkylammonium salts, alkylphosphonium salts, or alkylsulphonium salts, the quantity of cationic surfactants being such that the total charge in the ensemble of surfactants is negative and an inorganic surface of an aluminum source of the alumina $Al_2O_3$ is positive.

8. A hydrated aluminum compound according to claim 1, wherein the surfactant or surfactants comprise at least one non-ionic surfactant selected from alkylpolyethylene oxides, alkylphenylpolyethylene oxides, alkylphosphine oxides, or alkylamine oxides.

9. A hydrated aluminum compound according to claim 1, characterized in that its X ray diffraction diagram exhibits a peak which corresponds to an interplanar distance "d" of about 1 to 15 nanometers.

10. A hydrated aluminum compound according to claim 3, wherein the aluminum source of $Al_{13}$ aluminum exhibits tetrahedral sites associated with octahedral sites, in which the percentage of tetrahedral sites represents about 1% to 20% of aluminum.

11. A process for the synthesis of a hydrated aluminum compound according to claim 1, comprising at least one step of hydrolysing inorganic aluminum sources in the presence of at least one surfactant, said inorganic aluminum sources being formed by cation-monomers or cation-oligomers, these cations being used alone or as a mixture, said step being carried out in a mainly aqueous medium with a pH of about 4.5 to 10.5.

12. A synthesis process according to claim 11, wherein the cation-monomer is $[Al(H_2O)_6]^{3+}$.

13. A synthesis process according to claim 11, wherein the cation-oligomer is $[Al_{13}O_4(OH)_{24}(H_2O)_{12}]^{7+}$ with a Keggin structure.

14. A synthesis process according to claim 11 wherein the mainly aqueous synthesis medium contains an organic compound.

15. A synthesis process according to claim 14, wherein the organic compound is a hydrocarbon with a chain containing 5 to 12 carbon atoms per molecule, selected from alkanes, aromatic hydrocarbons substituted with one or more hydrocarbon groups, aliphatic alcohols or aliphatic amines.

* * * * *